Patented Feb. 2, 1954

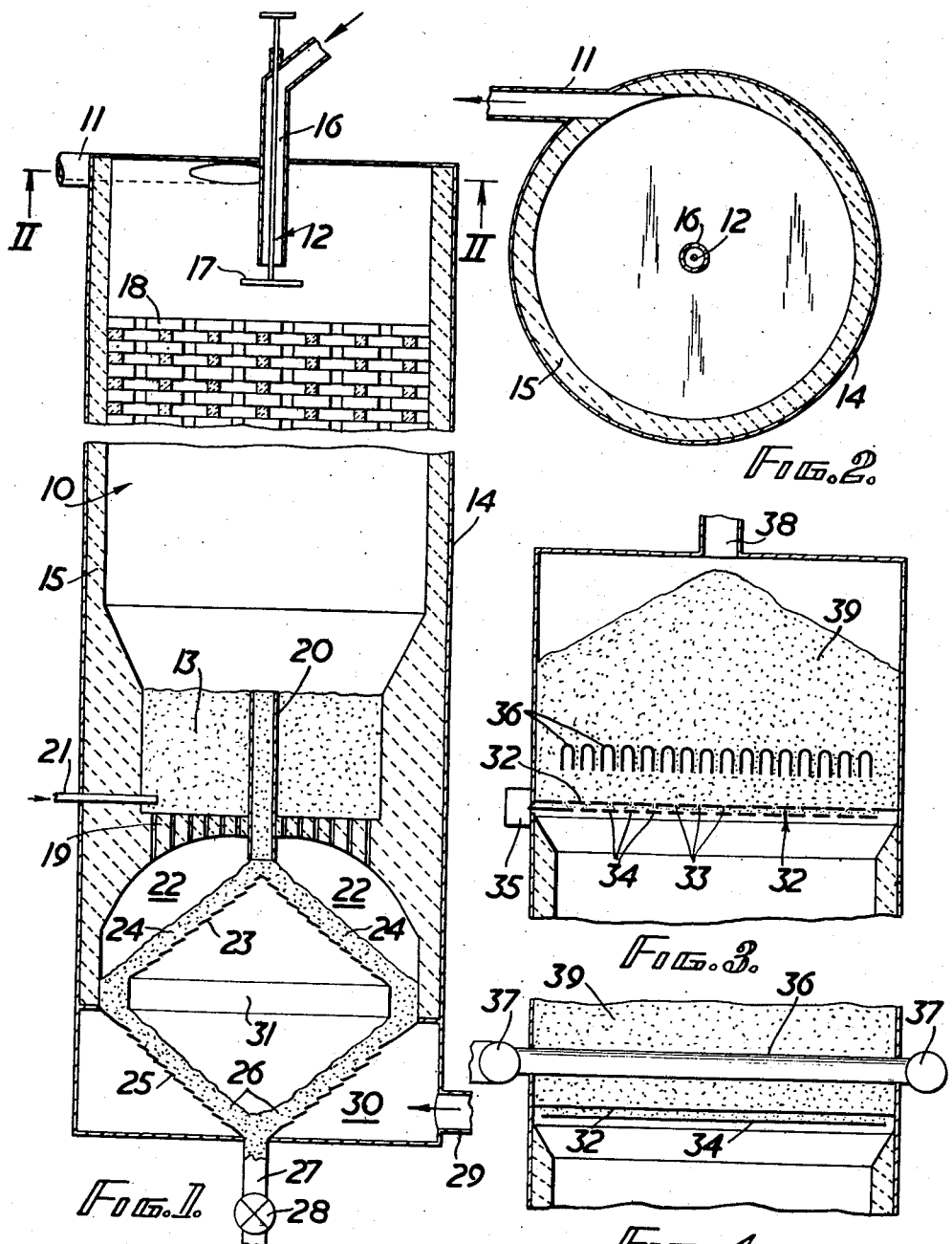

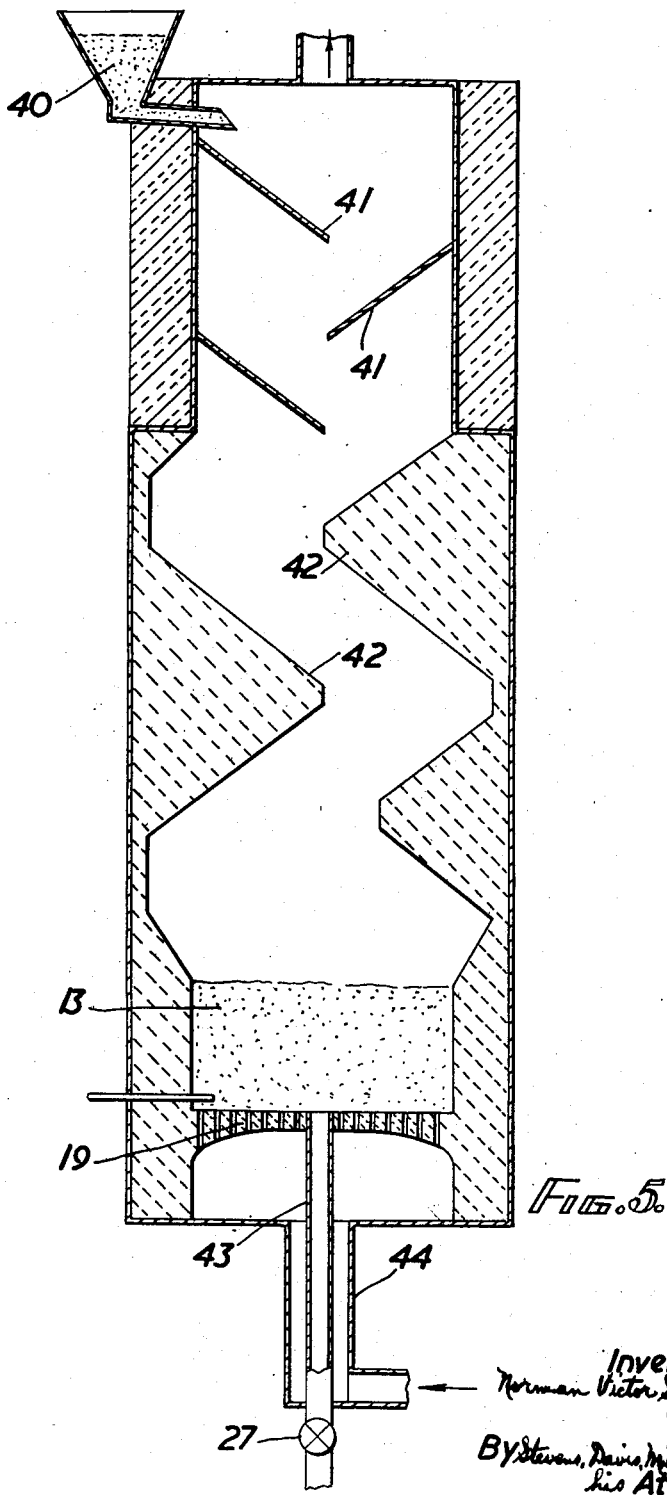

2,668,041

UNITED STATES PATENT OFFICE 2,668,041

HEAT TREATMENT OF FINELY DIVIDED SOLIDS

Norman Victor Sydney Knibbs, New Barn, Longfield, England

Application March 14, 1950, Serial No. 149,521

Claims priority, application Great Britain April 12, 1949

10 Claims. (Cl. 263—21)

This invention relates to the heat treatment of finely-divided solids and more particularly to apparatus for the heat treatment, including calcination, oxidation, reduction and drying, of such solids.

The principle known as the fluidized or boiling bed in which solid particles are maintained in a state of turbulence by the upward passage of gas through the bed of solid, has been applied to such furnaces, for example, small limestone from about ¼ inch downwards has been calcined in such a furnace, the fuel for calcination being burnt in the fluidized bed of calcining material. The rate of heat exchange is very high in the fluidized bed, so that the calcination operation is of high efficiency, but the overall thermal efficiency is low unless the heat in the hot gases leaving the calcining bed and in the hot calcined material is utilised. In lime burning, for example, the temperature of both the hot gases leaving the bed and of the hot calcined material is close to 900° C.

The heat may be partially recovered by having a number of fluidized beds in series. Thus a kiln has been proposed consisting of a number of fluidized beds one above the other, the heat flowing through each bed to the one below and the air or gases passing upwards through each bed in counter flow. The extent of the utilization of heat then depends on the number of beds employed. In lime burning for example, it has been proposed to use five beds, three above the calcined bed and one below it. There are however several disadvantages arising from these additional beds; they complicate the apparatus making it less accessible for repairs and they considerably increase the power required for the supply of air. Furthermore the dust from some materials tends to adhere to the sides of the perforations in the beds above the calcining bed, and to restrict these perforations, a difficulty that has been encountered in lime burning, and dust formation is increased by the plurality of beds because of the abrasion which occurs in each of them. The system of overflowing from one bed to another through tubular passages through the beds which is a feature of the fluosolid furnace with more than one bed is also liable to give trouble.

It is an object of the present invention to provide improved apparatus which retains the advantages of the fluidized bed for the actual calcination process but which is free from the disadvantages of the additional beds above the calcining bed whilst efficiently utilizing the heat in the gases and in the calcined product.

The type of apparatus with which the present invention is concerned consists of an upright kiln provided with an inlet for solids and an exhaust for gases at the top, and an outlet for solids and an inlet for air at the bottom, and it is provided in the lower half with a perforated bed and an outlet conduit for fluidized solid.

According to the present invention, in apparatus of the above type, there is provided in the top of the kiln means for distributing incoming solid as it falls down in counter current to hot gases arising from the fluidized bed, with or without means for conducting the hot gases through a layer of the solid material.

In an upright furnace or kiln constructed according to the invention, the incoming solid may be caused to descend in uninterrupted stream so that the gases from the fluidized bed pass longitudinally along and counter to the stream of solid particles. In this construction the means for distributing the incoming solid may take the form of a disc rotatably mounted beneath the top opening (with or without a chequer-work screen underneath the disc); or a grid or plate containing a large number of small openings distributed over the whole cross sectional area of the furnace may be provided in the upper part of the furnace, the solid particles being caused to fall out of each hole by vibration or otherwise.

Alternatively the solids may be caused to descend through a zig-zag path by means of baffles so that the rising gases are deflected and passed transversely through the stream of solid particles at each baffle. In this construction the means for distributing the incoming solid may be a series of plates or shelves on each side of the top part of the furnace slanting towards the middle of the furnace and staggered so that material falling on one plate will run down the plate and fall on to the next plate on the opposite side and the gases passing up between the plates will pass transversely through the stream of particles falling from one plate to another.

The hot calcined material leaving the fluidized calcining bed may be removed from the apparatus or it may pass to a lower chamber or to external cooling apparatus of known type where it is cooled, the air for cooling preferably being used for combustion in the fluidized bed.

The invention is illustrated by way of example in the accompanying drawings which show apparatus embodying alternative means for distributing the incoming solid against the rising hot gases to effect an exchange of heat between the two, and means for removing the calcined solids from the fluidized bed and for cooling them.

In these drawings,

Figure 1 is a sectional side elevation of an upright kiln according to the invention, including solid distributing means;

Figure 2 is an inverted plan view on the line II—II of Figure 1;

Figure 3 is a fragmentary sectional side elevation of a kiln according to the invention showing modified distributing and exhaust means;

Figure 4 is a fragmentary sectional side elevation of the kiln shown in Figure 3 taken at right angles thereto; and Figure 5 is a sectional side elevation of a further modified construction of kiln according to the invention.

In all the constructions shown in the drawings the preheating zone, indicated generally at 10, consists of a vertical chamber, preferably either circular or square in horizontal cross-section, in the upper portion of which are provided the outlet 11 for gases and the means for distributing the solids generally indicated at 12. The means for distribution 12 generally involve the use of metal and therefore, if the temperature of calcination is high, as in lime burning and similar operations, it is necessary to avoid the risk of subjecting the distributing apparatus 12 to the temperature of the fluidized bed generally indicated at 13. This risk is avoided by having a sufficient height between the fluidized bed 13 and the distributing apparatus 12 so that the gases are sufficiently cooled by the solid passing through them to ensure that they do not overheat the distributor.

In the construction shown in Figures 1 and 2, the kiln consists of a cylindrical shell 14 with an insulating refractory lining 15. The finely-divided solid material to be treated is introduced through the inlet passage 16 as indicated and falls onto a rotating disc or table 17 which spreads it over chequer-work 18 of metal or refractory or both, through which the solid falls counter to the hot gases rising from the bed 13. This chequer-work 18 fills the upper portion of the preheating zone and serves to delay the fall of the solid and to increase the heat exchange between the hot gases and solid particles.

If desired the chequer-work 18 may be dispensed with and the central portion of the preheating zone under the disc 17 may be blanked off by a closed cylinder (not shown) tapered at its lower end and suitably supported from the walls of the shell 14.

The hot gases, after being cooled by the descending solids, pass out of the shell 14 at the outlet 11 described hereinunder. A plurality of such outlets may be provided if desired.

The rotating table 17 tends to project the coarsest particles the farthest, so that they tend to fall down the walls while the finer particles fall nearer the centre of the preheating zone. The coarser particles also fall more rapidly than the finer ones and therefore have a shorter time in which to absorb heat from the gases. To increase the length of time of contact of the larger particles with the gases, a circulating or swirling motion may be imparted to the latter by arranging the outlet (or outlets) 11 tangentially at the top of the kiln.

The preheated material passing down the preheating zone falls onto the fluidized bed 13 which ordinarily is of smaller cross section than the preheating zone, as shown. In the construction shown in Figure 1 a perforated shelf 19 of refractory or metal or both, supports the material forming the bed 13 through which air passes to fluidize the bed and support combustion. Through this bed 13 passes a tube 20, of metal or refractory, which extends up to the position at which it is desired to fix the working level of the bed. The tube 20 is placed in the centre of the bed 13 so that the solid material passing down from the chequer-work 18 does not fall directly into it.

The fuel is ordinarily introduced into the bed 13 near its base through one or more inlet pipes 21. If oil is used it is pumped in, wets the calcining material and is burnt off it. Coal may be pulverised and blown into the bed entrained in as small as possible an amount of air. Gaseous fuel is blown directly into the bed. Fuel such as coke, nearly free from solid matter, may if desired be introduced with the solid material at the top of the preheating zone.

For calcinations carried out at relatively low temperatures, hot gases provided by an external furnace or other means, not shown, may be blown into a space 22 below the fluidized bed to rise up through the perforated shelf 19. If desired part of the gases from the outlet 11 or from the upper part of the furnace may be recirculated to the fluidized bed, or below it, to reduce the temperature in the bed.

The calcined solids leaving the bed 13 pass into the space 22 and thence down the outside of a perforated cone 23, either louvered as shown or made with perforations smaller than the solid material, to prevent the material passing through. This cone 23 is sloped at the angle of repose of the surface of the material and a uniform layer 24 forms on the cone. The material passes around the bottom of the cone and down the interior of a similar but inverted cone 25 forming a layer 26 and thence to a central outlet 27 controlled by a valve 28. Air for combustion is blown through the inlet pipe 29 into the space 30, and passes first through the layer of material 26 into the space 31 between the cones 23 and 25 and then through the layer of material 24 and thence into the fluidized bed. The air is thus heated and the material cooled by double passage of the air through the material.

Alternatively a cooling zone with chequer-work, not shown, similar to the chequer-work 18 described above for preheating may be employed, or the calcined material may pass directly out of the apparatus to storage or to an external cooler.

In the construction shown in Figures 3 and 4 the apparatus may be square in cross-section, with rounded corners, or it may be of circular or other cross section. The distributing means for the finely-divided material comprises a plate generally indicated at 32 suitably stiffened, in which are longitudinal slots 33 extending nearly the full width of the vessel. Under each slot 33 is a strip or slat 34, and all these slats are connected together, suitably supported, and connected to an external mechanism 35 which gives the slats 34 a to-and-fro motion at right angles to the slats. Across the full width of the vessel, above the plate 32, pass inverted trough shaped flues 36 which pass out to headers 37. The upper portion of the vessel above the plate 32 is kept supplied through an inlet 38 by the finely-divided solids 39 to be calcined, the said solids which also fill the space between the flues 36 and the plate 32 passing through the slots 33 onto the slats 34. The reciprocating movement of the latter, however discharges it over the edges of the slats and showers it down over the whole area of the vessel, meeting the upcoming gases. These gases finally pass through the slots 33 and the bed of material between the plate 32 and the flues 36 and in so doing lose heat to the solid material before being conducted out through the flues 36 and headers 37 to atmosphere or to a cyclone, not shown.

Instead of being slotted, the plate 32 may be pierced with holes large enough to pass the largest of the pieces of solid material, but small enough to impede free flow, the slats 34 being dispensed with. The plate 32 is connected to an external electrically operated vibrating box, corresponding with the mechanism 35, whereby the plate 32 is vibrated so that the material falls through the holes in the plate at a rate dependent on the vibration, in the same way as material passes through a sieve.

In either of the constructions described immediately above, the mechanism is designed for variation of the amplitude of the movement to vary the rate of feed.

In the construction shown in Figure 5, the kiln is preferably rectangular in horizontal cross section with a fluidized bed 13 of circular cross section, the width of the section of the kiln shown in this figure being less than the breadth of the kiln at right angles thereto. The solid material is fed into the upper part of the kiln through a feeder 40 and passes downwards over a series of deflector plates 41 beneath which refractory deflectors 42 may be provided if the temperature of the calcining bed 13 is high. The hot gases flowing upwards thus have to pass a number of times equal to the number of deflectors through the solids showering downwards. This type of preheating zone may be of other shape, for example it may take the form of an annular space in a cylindrical preheater.

As shown in Figure 5 the top of the outlet tube 43 for the calcined material is arranged level with the top of the perforated shelf 19, and the level of the material in the bed 13 is controlled by a valve 27 in the tube 43. This valve may be operated to maintain a constant depth in the fluidized bed, either manually or automatically by the pressure of the air under the bed as the said pressure depends on the depth of the bed. The outlet tube 43 is surrounded by an external tube 44, the air for combustion being blown in through the annular spaced between the tubes.

To avoid damage to the feed mechanism in the event of a stoppage of the feed, which would result in an immediate rise of temperature, an automatic device may be provided. For example, a rise to a temperature approaching the danger point may be made to stop the fuel supply and the supply of air to the fluidized bed and to substitute instead a supply of cold air to the upper part of the furnace.

It is to be understood that the invention is not limited to the particular construction described above but includes any other combination of apparatus for heat exchange between finely-divided solids and gases with the fluidized calcining bed.

What I claim is:

1. Apparatus for heat treating finely-divided solids, comprising an upright kiln, an inlet for solids and an exhaust outlet for gases at the top of the kiln, an outlet for solids and an inlet for air at the bottom of the kiln, a perforated support for a fluidized bed in the lower half of the kiln, an outlet from said bed for fluidized solid, a preheating zone of greater cross-sectional area than the cross-sectional area of the bed in the upper part of the kiln and a chequer-work screen of metal or refractory in said preheating zone for distributing the incoming solid as it passes down through this zone of the kiln in counter-current to hot gases rising from the fluidized bed, so as to increase the utilisation of the heat in the hot gases leaving said bed for preheating the incoming solid.

2. Apparatus as claimed in claim 1, including a disc rotatably mounted beneath the top inlet for spreading the incoming solid over the chequer-work screen.

3. Apparatus as claimed in claim 1, including a disc rotatably mounted beneath the top inlet for spreading the incoming solid over the chequer-work screen, and means for conducting the hot gases through a layer of the solid material.

4. Apparatus as claimed in claim 1, including a disc rotatably mounted beneath the top inlet for spreading the incoming solid over the chequer-work screen and a horizontally disposed slotted plate in the upper part of the kiln, a series of connected slats, one slat under each slot, and means for reciprocating said slats in a direction at right angles to their length.

5. Apparatus as claimed in claim 1, including a disc rotatably mounted beneath the top inlet for spreading the incoming solid over the chequer-work screen, a horizontal perforated plate in the upper part of the kiln and means for vibrating the plate to cause finely-divided material to pass through the perforations therein.

6. Apparatus as claimed in claim 1, including a disc rotatably mounted beneath the top inlet for spreading the incoming solid over the chequer-work screen and a series of slanting fire brick hearths in the lower part of the kiln above the fluidized bed, the hearths on one side of the kiln being staggered with respect to the hearths on the other side of the kiln so that the descending finely-divided material follows a zig-zag path.

7. Apparatus as claimed in claim 1, including a series of baffle plates on each side of the upper part of the kiln slanting downwardly towards the centre of the kiln, and a series of slanting firebrick hearths in the lower part of the kiln above the fluidized bed, the plates and hearths on one side of the kiln being staggered with respect to the plates and hearths on the other side of the kiln so that the descending finely-divided material follows a zig-zag path.

8. Apparatus as claimed in claim 1, comprising a perforated or slotted plate horizontally disposed in the upper part of the kiln, means for controlling the passage of particles through said plate and a series of parallel inverted trough shaped flues above said plate for conducting the exhaust gases to external headers.

9. Apparatus as claimed in claim 1, wherein the outlet from the fluidized bed consists of a tube passing through the perforated support for said bed, the top of the tube being level with the top of said support, and an outlet valve being provided in said tube for controlling the level of the bed.

10. Apparatus as claimed in claim 1, including an outlet tube from the fluidized bed passing through the perforated support for said bed with the top of the tube level with the top of said support, an outlet valve in said tube for controlling the level of the material in the bed, and an external tube for the introduction of combustion air surrounding said outlet tube.

NORMAN VICTOR SYDNEY KNIBBS.

References Cited in the file of this patent

UNITED STATES PATENTS

| Number | Name | Date |
|---|---|---|
| 569,361 | Stockford | Oct. 13, 1896 |
| 669,411 | Suiternon | Mar. 5, 1901 |
| 1,399,046 | Bowman | Dec. 6, 1921 |
| 1,533,572 | Richards | Apr. 14, 1925 |
| 1,836,301 | Bechtold | Dec. 15, 1931 |
| 2,057,610 | Diehl | Oct. 13, 1936 |
| 2,070,531 | Gallagher et al. | Feb. 9, 1937 |
| 2,194,454 | Greenawalt | Mar. 19, 1940 |
| 2,409,707 | Roetheli | Oct. 22, 1946 |
| 2,498,710 | Roetheli | Feb. 28, 1950 |
| 2,528,098 | White | Oct. 31, 1950 |
| 2,529,366 | Bauer | Nov. 7, 1950 |